June 7, 1932. H. D. WENDT 1,861,559
PROCESS OF OBTAINING THE BUTTER FAT FROM SOUR MILK PRODUCTS
Filed Dec. 11, 1929
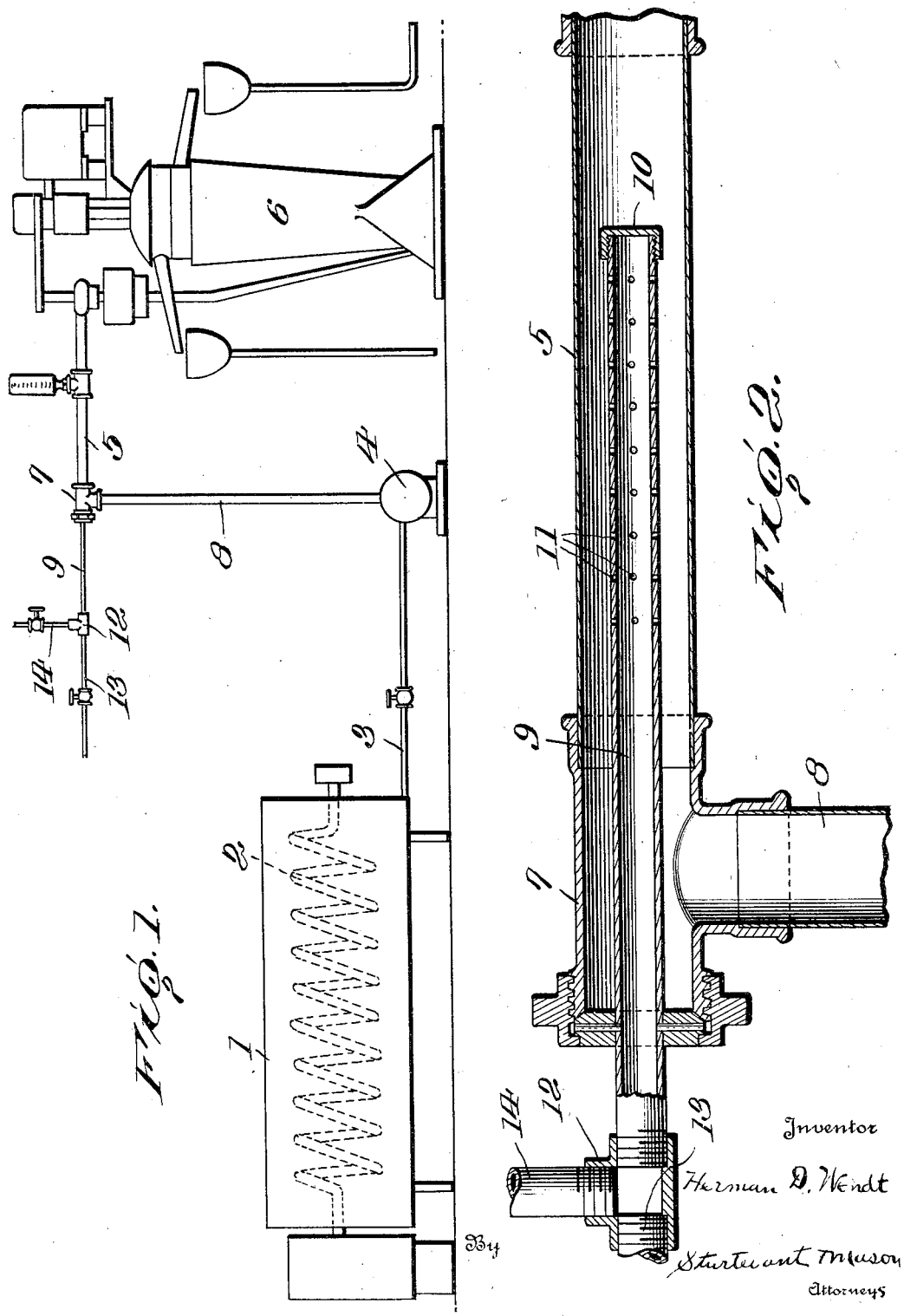

Patented June 7, 1932

1,861,559

UNITED STATES PATENT OFFICE

HERMAN D. WENDT, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA

PROCESS OF OBTAINING THE BUTTER FAT FROM SOUR MILK PRODUCTS

Application filed December 11, 1929. Serial No. 413,279.

The invention relates to new and useful improvements in a process of obtaining the butter fat in the form of cream from sour milk products.

An object of the invention is to provide a process of obtaining the butter fat from sour milk products by the use of a centrifugal separator wherein a heat carrying medium is introduced into the flowing stream of the sour milk product at a point adjacent the centrifugal separator for promoting the fluidity of the sour milk product through the separator and thus increasing the efficiency of the separation.

A further object of the invention is to provide a process of obtaining the butter fat from sour milk products by the use of a centrifugal separator wherein water is introduced into the flowing stream of the conditioned sour milk product as it flows to the centrifugal separator so as to produce a carrying medium for portions of the curd and the reacting products of the neutralizer used in conditioning the sour milk product preparatory to the separation of the butter fat therefrom.

Another object of the invention is to provide a process of obtaining the butter fat from sour milk products by the use of a centrifugal separator wherein a heating medium such as steam and water is introduced into the flowing stream of sour milk products as it enters the centrifugal separator.

These and other objects will in part be obvious and will in part be hereinafter more fully disclosed.

In the drawing:—

Figure 1 is a diagrammatic view showing in side elevation the essential features of an apparatus which may be used for carrying out the process.

Fig. 2 is an enlarged sectional view showing the manner of introducing the steam or water or both into the flowing stream of sour milk products as it passes to the separator.

The invention is directed to a process of treating sour milk products and more particularly sour cream for the purpose of obtaining the butter fat in the form of cream therefrom. The sour milk product is first treated with a neutralizing agent of a character which will disperse the curds. Soda ash is preferably used, although any other alkaline agent may be used in lieu thereof which will neutralize the acid and disperse the curds.

In order to neutralize the acid of the sour milk products before heat is applied thereto to any considerable extent the acid neutralizing agent is first added to the sour milk product at substantially normal factory room temperature and in sufficient quantity to neutralize the acid and disperse the curds. This is preferably done by adding the neutralizer to a batch of sour milk product in a vat which may be forewarmed to facilitate the dispersing action of the neutralizer on the curds. After the sour milk product has been thus conditioned it is passed through a mechanical separator. This is preferably accomplished by the aid of a pump which forcibly discharges the sour milk product in a continuous stream into the feed cup of the centrifugal separator.

A heat carrying medium, preferably in the form of steam, is introduced into the flowing stream of the conditioned sour milk product at a point adjacent the centrifugal separator. This will heat the sour milk product quickly and for a short interval of time only. This heating of the sour milk product just prior to the passing of the same through the centrifugal separator greatly increases the fluidity of the product and reduces clogging of the outlets and the accumulation of curds on the blades in the bowl and in this way the efficiency of the separation of the butter fat from the sour milk product is greatly increased.

I may also introduce water into the flowing stream of conditioned milk product at a point adjacent the centrifugal separator in sufficient quantity to increase the volume of the sour milk product from ten to fifty percent. This results in creating a carrying medium for portions of curd and the reacting products of the neutralizer which further increases the efficiency of the separation.

I may also introduce both steam and water into the flowing stream of sour milk product at a point adjacent the centrifugal separator so as to supply heat to the sour milk product for a short interval of time to facilitate the separation of the butter fat and to create a carrying medium for portions of curd and the reacting products of the neutralizer.

Possibly the invention will be better understood by a brief reference to the apparatus and a more detailed statement of the steps practiced in carrying out the invention. In Fig. 1 of the drawing the apparatus which is shown in part consists of a vat 1 in which the sour milk product is placed. The neutralizing agent is placed in this vat and thoroughly incorporated in the sour milk product. Soda ash is preferably used. The sour milk product is treated in this vat at normal factory room temperature. In cold weather it may be desirable to fore-warm the sour milk product in the vat so as to bring it up to substantially this normal factory room temperature. This may be accomplished by a heating coil 2 which extends through the sour milk product in the vat and by the use of a suitable heating medium passing through the coil the batch may be heated to the desired temperature.

It will be understood, of course, that the sour milk product may be treated with a neutralizing agent and the curds dispersed by other means than by the batch method.

The conditioned sour milk product is caused to flow through a pipe 3 by a pump 4 which delivers the product to a pipe 5 and the sour milk product flows in a continuous stream from this pipe 5 into a mechanical separator indicated at 6. This mechanical separator may be of any desired construction which is capable of separating the butter fat from the dispersed curds of the sour milk product. The pipe 5 is connected to a T-coupling 7 and this T-coupling in turn is connected by a pipe 8 with the pump. Extending into the pipe 5 through the T-coupling 7 is a pipe 9. The inner end of the pipe 9 is closed by a cap 10. The pipe 9 is of considerably less diameter than the pipe 5 and extends to a point well beyond the T-coupling so that the flowing stream of sour milk product passes along the pipe 9. This pipe 9 is provided with a series of radial ports 11, 11. Preferably four radial ports are provided forming a unit of ports and these units are spaced along the pipe, as shown in Fig. 2. The pipe 9 is connected with a T-coupling 12. A pipe 13 is attached to this T-coupling in alignment with the pipe 9. A pipe 14 is also attached to the T-coupling. Suitable valves are provided in these pipes 13 and 14. The pipe 13 is preferably connected with a steam supply whereby steam may be admitted to the pipe 9 and allowed to issue from the radial ports 11 into the flowing stream of the conditioned sour milk product.

By providing a series of ports the steam as it enters the flowing stream will be thoroughly distributed and blended therewith. This quickly heats the flowing sour milk product so as to facilitate the separation within the bowl. The sour milk product will pass through the bowl in a very short interval of time, possibly ten seconds, so that the sour milk product is heated for only a very short interval of time before separation takes place and the products are discharged from the separator bowl. The addition of steam to the flowing conditioned milk product increases the fluidity of the conditioned sour milk product through the centrifugal separator. This in turn reduces the clogging of the outlets and the formation of curds in the bowl and greatly increases the efficiency of the separation.

It is well known that when a sour milk product is left in a heated condition for a considerable time after the neutralizing agent has been allowed to act thereon a curd condition results which renders some of the fats difficult of separation. Furthermore, the subjecting of the butter fat to heat for a long interval of time renders possible an objectionable saponification. By introducing the heat carrying medium at a point close to the separator so that the sour milk products are subjected to this heat for only a comparatively short interval of time all these objections to the heating of the sour milk product are reduced to a minimum, and the advantage of the increased fluidity of the product through the separator obtained.

The pipe 14 is connected to a suitable water supply whereby water may be delivered to the pipe 9 and from the pipe 9 into the flowing stream of conditioned sour milk product. The steam may be cut off and the water alone used, or the water and steam may both be used. The water may be heated by the steam or otherwise heated before it is introduced to the flowing stream of the sour milk product. The heating of the sour milk product accomplishes the results which have been stated above. The quantity of water introduced into the sour milk product is sufficient so as to increase the volume of the product being treated from ten to fifty percent. The water creates a carrying medium for portions of curd and the reacting products of the neutralizer. This greatly increases the fluidity of the product being treated in the separator. By introducing the water into the flowing stream at a point adjacent the separator the water is in contact with the butter fat for only a short period of time and this prevents giving the butter fat in the form of cream passing out of the separator a washed or flat flavor. Furthermore, if the water is added to the batch in the quantity necessary to accomplish this carrying vehicle, the size of the vat would have to be greatly increased thus increasing the cost of installation.

From the above it will be apparent that I have provided a process of obtaining butter fat from sour milk products by the aid of a centrifugal separator wherein heat is imparted to the sour milk product for a sufficient time to increase the fluidity of the sour milk product through the separator without any objectionable results. Under certain conditions of the sour milk product this is all that is necessary; under other conditions it is desirable to supply water in such volume and for such a short interval of time as to create a carrying vehicle for portions of curd and reacting products of the neutralizer, and this is accomplished without any of the objectionable results of the presence of the water in such volume in the sour milk product either during conditioning or during the passing of the sour milk product from the conditioning vat to the separator. Under certain conditions water and steam are both used and under other conditions water alone may be used for accomplishing the desired result of fluidity in the sour milk product passing through the centrifugal separator.

It is understood that the apparatus has been illustrated merely for the purpose of aiding in an understanding of the process and that other forms of apparatus may be used for carrying out the invention. The amount of steam used may be varied depending upon the desired temperature to which the flowing stream of sour milk product is to be heated. Under certain conditions of sour milk product being treated the flowing stream will be raised to a temperature of 100 degrees Fahrenheit; under other conditions it may be raised to 200 degrees Fahrenheit. The range of temperature may be readily controlled by the steam admitted to the flowing sour milk product or by the temperature of the water introduced into the flowing stream.

Having fully described my invention what I claim as new and desire to secure by Letters Patent is:

1. The process of obtaining the butter fat in the form of cream from sour milk products consisting in adding an acid neutralizing and curd dispersing agent to the milk product, passing the conditioned milk product in a continuous stream through a centrifugal separator, and introducing a heat carrying medium into the flowing stream of conditioned milk product at a point adjacent the centrifugal separator for promoting the fluidity of the conditioned sour milk product passing through the separator and increasing the efficiency of the separation.

2. The process of obtaining the butter fat in the form of cream from sour milk products consisting in adding an acid neutralizing and curd dispersing agent to the milk product, passing the conditioned milk product in a continuous stream through a centrifugal separator, and introducing steam into the flowing stream of conditioned milk product at a point adjacent the centrifugal separator for promoting the fluidity of the conditioned sour milk product passing through the separator and increasing the efficiency of the separation.

3. The process of obtaining the butter fat in the form of cream from sour milk products consisting in adding an acid neutralizing and curd dispersing agent to the milk product, passing the conditioned milk product in a continuous stream through a centrifugal separator, and introducing steam and water into the flowing stream of conditioned milk product at a point adjacent the centrifugal separator for promoting the fluidity of the conditioned sour milk product passing through the separator and for creating a carrying medium for portions of curd and the reacting products of the neutralizer.

In testimony whereof, I affix my signature.

HERMAN D. WENDT.